Sept. 8, 1925.

J. H. MINER ET AL
INSERTABLE SAW TOOTH
Filed Oct. 31, 1924

1,552,493

Inventors:
James H. Miner,
Hiram B. McDonald,
Attys.

Patented Sept. 8, 1925.

1,552,493

UNITED STATES PATENT OFFICE.

JAMES H. MINER, OF MERIDIAN, MISSISSIPPI, AND HIRAM B. McDONALD, OF FITCHBURG, MASSACHUSETTS.

INSERTABLE SAW TOOTH.

Application filed October 31, 1924. Serial No. 746,989.

*To all whom it may concern:*

Be it known that we, JAMES H. MINER and HIRAM B. McDONALD, citizens of the United States, and residents of Meridian, in the county of Lauderdale and State of Mississippi, and Fitchburg, in the county of Worcester and State of Massachusetts, respectively, have invented certain new and useful Improvements in Insertable Saw Teeth, of which the following is a specification.

Our present invention relates to improvements in insertable saw teeth for circular saws, and the invention aims to provide a construction in which the tooth may be readily entered and drawn into the recess in the saw blade by the action of the holder, but at the same time will be firmly held in position after it is properly seated.

With saws using the customary form of insertable saw teeth, great difficulty has been experienced in preventing the teeth from being dislodged, broken, or drawn out, in working in hard and knotty timber, this being due to the fact that it is not possible to make the parts with a sufficiently tight fit, because if so made, the tooth cannot be started into the saw recess, due to the fact that its lower portion acts as a shoulder to prevent the entering of the tooth, and this objection is overcome by the present invention.

The said invention comprises the novel construction hereinafter described and defined by the appended claim.

An embodiment of our invention is shown in the accompanying drawing, in which—

Figure 1:
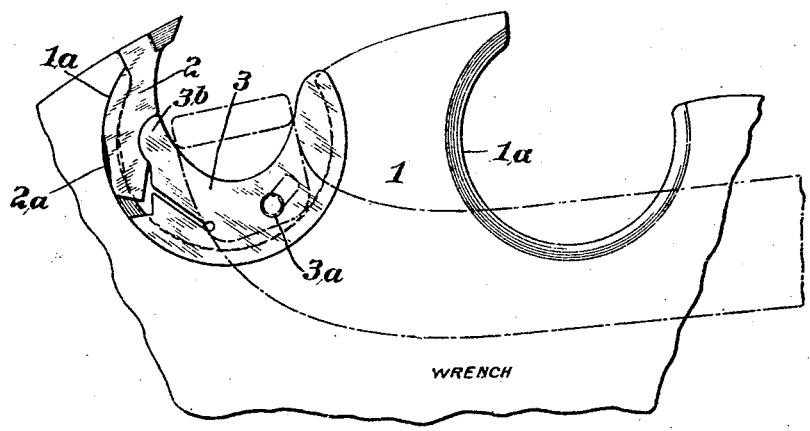
Figure 2:
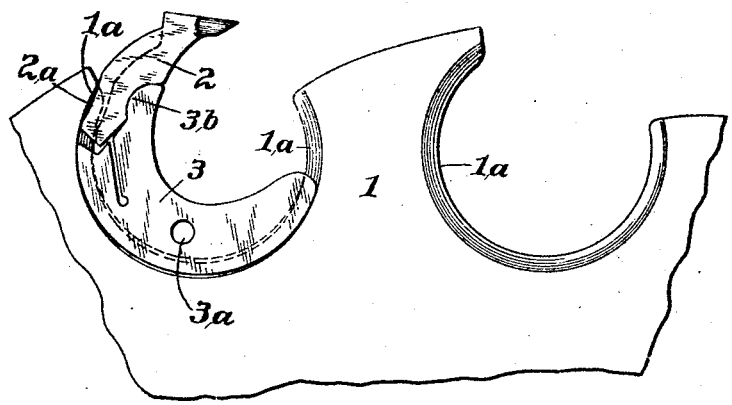

Figure 1 is a plan view of a portion of a saw blade showing our improved tooth in place, and Fig. 2 is a similar view showing the tooth entered in the saw recess, but not turned or drawn down into final position.

Referring by reference characters to this drawing, the numeral 1 designates the saw blade, 2 the tooth portion of the insertable tooth, and 3 the holder, or device by which the tooth is drawn down into the recess $1^a$ in the saw and held locked in cutting position. These recesses, such as $1^a$, as is well known, are of semicircular formation and provided with wedge-shaped or convex edges which engage correspondingly shaped grooves in the exterior corresponding curved faces of the tooth portion and holder. According to our present invention, instead of making the entire convex surface of the tooth of truly circular form, we provide it with a depression, as indicated at $2^a$, somewhat removed from the inner end of the tooth, which depression may be in the shape of a slightly flattened portion, or even slightly concaved. The result of this is that as the tooth and holder are entered in the position shown in Fig. 2, the edge or shoulder $1^a$ of the saw recess passes readily over the end of the tooth, the recess permitting this, and thereafter it is a relatively simple matter to draw the tooth down by the use of the customary wrench engaging the opening $3^a$ in the holder. At the same time it will be observed that as the recess $2^a$ is at some little distance from the lower end of the tooth, the tooth has a full bearing at its lower end and below the recess, as well as the full bearing for a relatively long distance above the recess. The result of this is that the teeth may be constructed to be held in the saw recess with a much tighter fit than is possible with constructions at present in use, while at the same time, they are entered into the saw recess with comparative ease, and require no other change in the shape of tooth or holder.

It will be understood that the holder is of the customary type, being provided with a rounded head portion $3^b$ which engages a corresponding recess in the inner face of the tooth, which when the holder is rotated in a counter-clockwise direction, draws the tooth into the recess and holds it locked in position.

Having thus described our invention, what we claim is:—

An insertable saw tooth for use in saw blades having substantially semicircular tooth receiving recesses, comprising a tooth having a semicircular portion to fit and engage the recess, said semicircular portion having a depression of substantial extent peripherally of said portion adjacent but spaced from the inner end of the tooth, and an arc-shaped holder cooperating with said tooth, substantially as, and for the purpose described.

In testimony whereof we affix our signatures.

JAMES H. MINER.
HIRAM B. McDONALD.